(12) United States Patent
Flinn

(10) Patent No.: US 6,657,550 B1
(45) Date of Patent: Dec. 2, 2003

(54) WIRELESS LOCK-OUT SYSTEM, APPARATUS AND METHOD FOR USING THE SAME

(76) Inventor: Steve Flinn, 1285 E. Sycamore St., Canton, IL (US) 61520

(*) Notice: Subject to any disclaimer, the term of this patent is extended or adjusted under 35 U.S.C. 154(b) by 0 days.

(21) Appl. No.: 09/416,363

(22) Filed: Oct. 12, 1999

(51) Int. Cl.[7] .................. G08C 19/00; G09B 3/00
(52) U.S. Cl. .................. 340/825.72; 340/825.69; 340/5.31; 340/825.72; 340/323 R; 463/39; 434/351; 434/352
(58) Field of Search ................. 340/825.69, 825.72, 340/7.25, 7.2, 321, 323 R, 331, 332, 5.31; 434/128, 327, 336, 350, 351; 463/39, 40

(56) References Cited

U.S. PATENT DOCUMENTS

| | | | |
|---|---|---|---|
| 3,676,939 A | 7/1972 | Oberst et al. ............ 434/351 |
| 3,762,072 A | 10/1973 | From ...................... 434/350 |
| 3,763,577 A | 10/1973 | Goodson ................. 434/352 |
| 3,852,894 A | 12/1974 | Rylan ..................... 434/352 |
| 4,079,365 A | 3/1978 | Yamauchi ................ 340/10.1 |
| 4,290,141 A | 9/1981 | Anderson et al. .......... 725/24 |
| 4,319,222 A | 3/1982 | Davis et al. ............ 340/825.5 |
| 4,377,870 A | 3/1983 | Anderson et al. .......... 725/24 |
| 4,392,132 A | 7/1983 | Derks ................... 340/825.2 |
| 4,489,316 A | 12/1984 | MacQuivey ............. 345/156 |
| 4,493,655 A | 1/1985 | Groff ..................... 434/351 |
| 4,750,118 A | * 6/1988 | Heitschel et al. ....... 340/825.69 |
| 4,764,120 A | 8/1988 | Griffin et al. ............ 434/336 |
| 4,767,335 A | 8/1988 | Curt ...................... 434/352 |
| 4,868,564 A | * 9/1989 | Falconer ............... 340/825.69 |
| 4,948,126 A | 8/1990 | Drummond ................ 463/1 |
| 5,092,779 A | 3/1992 | Piwonka et al. .......... 434/352 |
| 5,093,786 A | 3/1992 | Derks ..................... 340/5.5 |
| 5,146,215 A | * 9/1992 | Drori .................. 340/825.69 |
| 5,204,768 A | 4/1993 | Tsakiris et al. ........ 340/825.72 |
| 5,273,437 A | 12/1993 | Caldwell et al. .......... 434/351 |
| RE35,449 E | 2/1997 | Derks .................... 340/10.32 |
| 5,650,774 A | * 7/1997 | Drori ................. 340/825.69 |
| 5,724,357 A | 3/1998 | Derks .................... 340/10.32 |
| 5,823,788 A | 10/1998 | Lemelson et al. ......... 434/350 |
| 5,842,871 A | 12/1998 | Cutler et al. ............. 434/335 |
| 5,870,214 A | 2/1999 | Knowles .............. 340/825.72 |

* cited by examiner

Primary Examiner—Donnie L. Crosland
(74) Attorney, Agent, or Firm—Patents TMS, P.C.

(57) ABSTRACT

A wireless lockout apparatus, a system and a method for using the same are provided for receiving wireless signals from individual transmitters. When a first signal has a code that matches a reference code in a decoder, the decoder locks out subsequent signals and only allows the first transmitted signal to be routed through the processor. The processor determines which contestant sent the signal by interpreting the coded signal and indicates audibly and/or visually to which contestant the signal corresponded. A master transmitter has a bonus button and a reset button. The bonus button indicates a bonus question condition in a particular game. The reset button unlocks the decoder and allows the system to receive contestants' signals transmitted wirelessly.

20 Claims, 4 Drawing Sheets

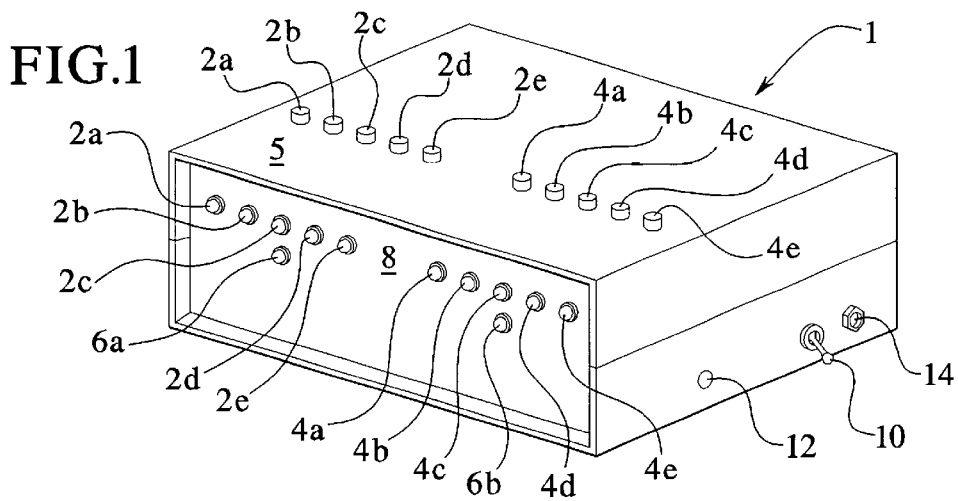
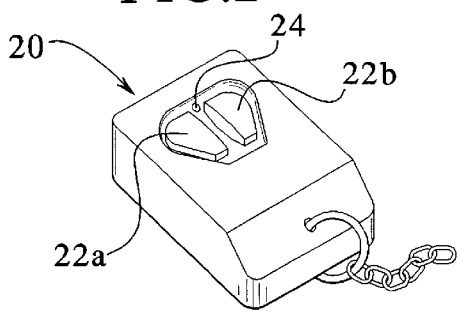
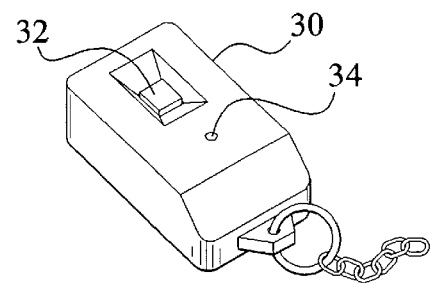
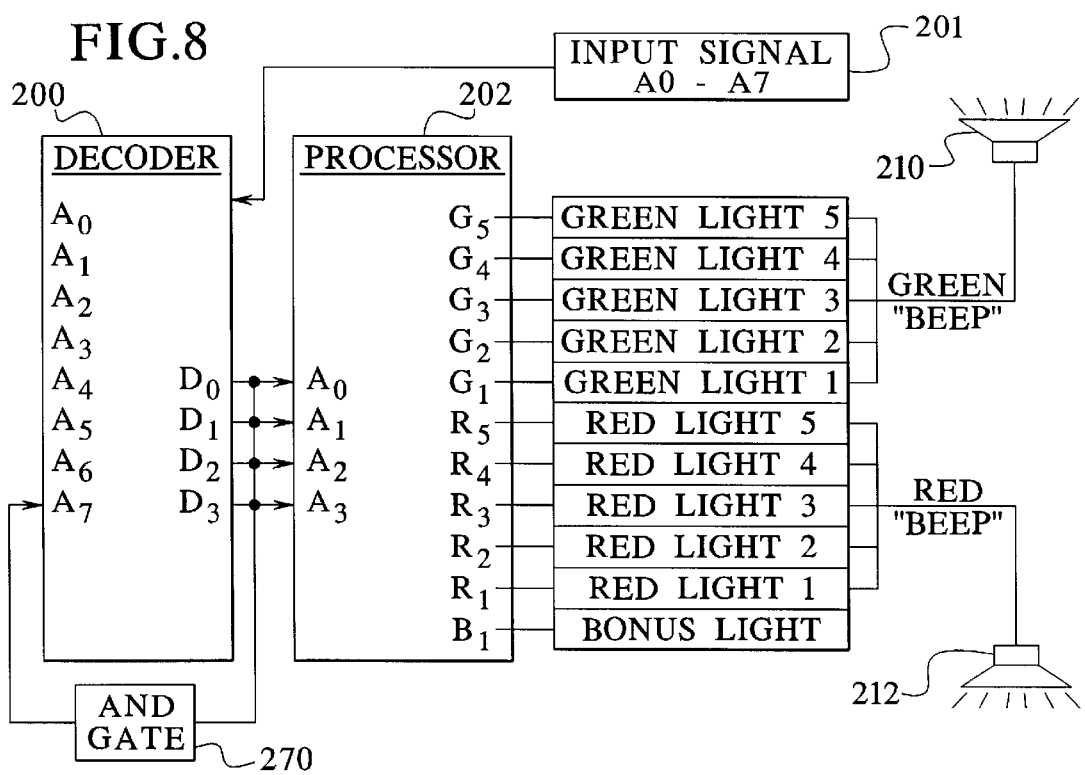

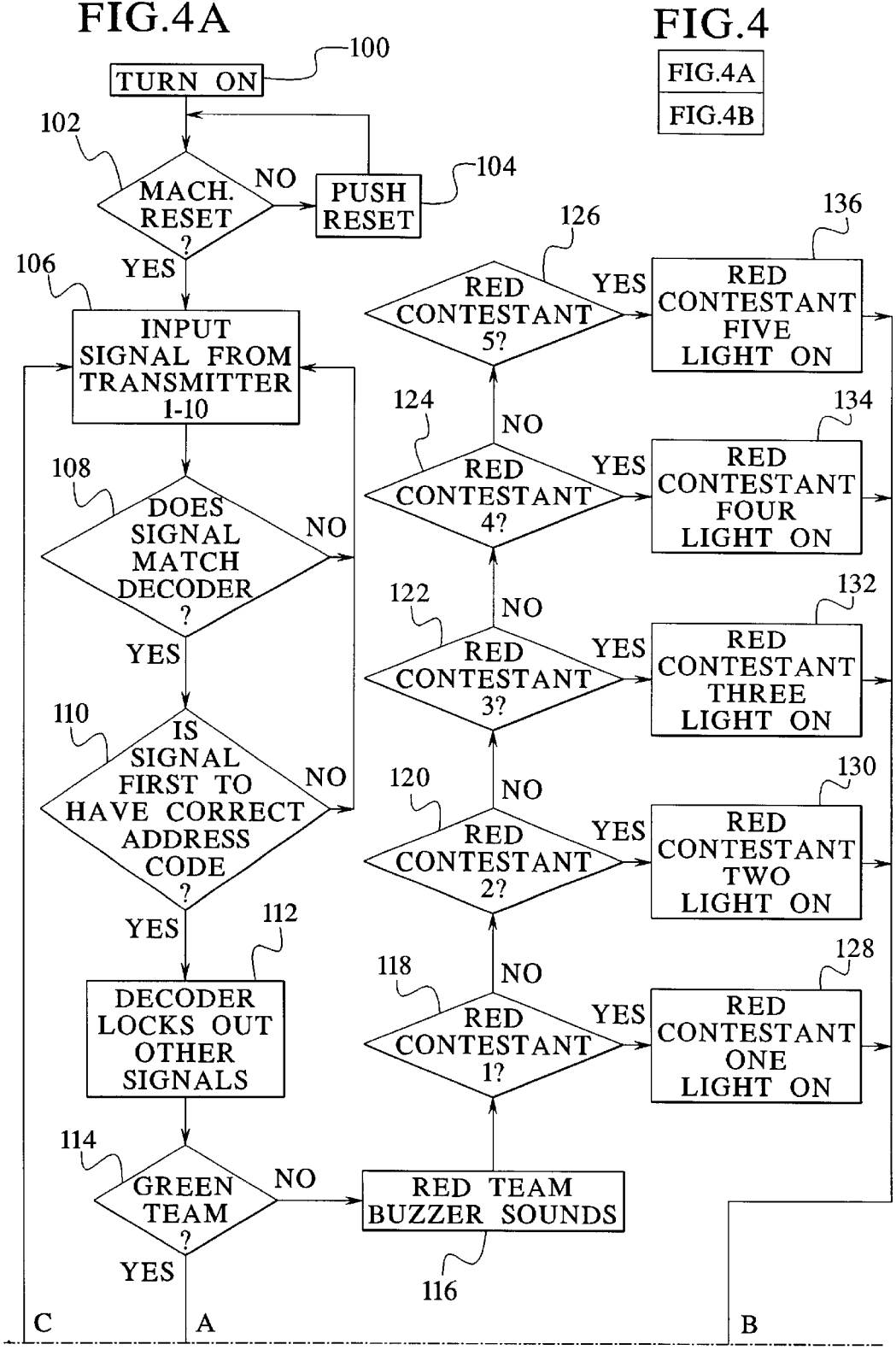

WIRELESS LOCK-OUT SYSTEM, APPARATUS AND METHOD FOR USING THE SAME

BACKGROUND OF THE INVENTION

The present invention generally relates to a wireless lock-out system and apparatus. More specifically, the present invention relates to a wireless lock-out mechanism having a number of signal devices and a receiver that allows a first transmitted signal with a correct transmission code to be gated through the system. Further, the mechanism locks out subsequent signals from being gated through the system after a first signal has been gated. This is particularly useful in competitions, such as, for example, a scholastic bowl competition where questions are presented and a number of contestants vie to be the first person to have the opportunity to answer the question correctly. Further, the present invention relates to a method of using the system and apparatus.

It is, of course, generally known to provide a system that allows one or more contestants to "buzz in" to identify the first person to answer a question. However, known mechanisms require hard-wired signaling devices that contestants must use. Often, however, the wiring of such devices presents difficulties for the users of the device. Many malfunctions may occur that may be caused by broken wires, loose wires, loose plugs and/or burned out light bulbs, for example. Consequently, systems that are hard-wired and interconnected tend to be unreliable and expensive to repair and/or replace, if required.

Further, many signaling devices do not adequately lock-out other contestants from signaling after the first contestant has signaled. It is extremely important in competitions, such as scholastic bowl competitions, to adequately and consistently determine the first to signal. This promotes both fairness and faith in the system.

Further, many systems are large, bulky and generally immovable. In addition, many systems require an electronic interface with a wall socket further decreasing the mobility of the system.

A need, therefore, exists for an improved wireless lock-out signaling apparatus, system and method for using the same to overcome the problems associated with known signaling systems and devices.

SUMMARY OF THE INVENTION

The present invention provides a wireless lock-out signaling apparatus including wireless transmission means, a system and a method for using the same. More specifically, the present invention provides a wireless lockout signaling device, system and method for using the same that has few or no moving parts, wires or bulbs to burn out.

To this end, in an embodiment of the present invention, a wireless lock-out system is provided. The system has a plurality of wireless transmission means for transmitting a signal wherein each signal uniquely identifies one of the plurality of wireless transmission means. A receiver is provided for receiving the signal wherein the receiver is capable of identifying a first transmitted signal and further wherein the receiver is capable of locking out subsequent signals from entering the receiver. An indicator means is provided for identifying the first transmitted signal.

In an embodiment, a master wireless transmission means is provided for unlocking the decoder after the first transmitted signal has locked out the subsequent signals.

In an embodiment, the indicator is an audible signal.

In an embodiment, the indicator is a visual signal.

In an embodiment, the receiver has a decoder for decoding the first transmitted signal.

In an embodiment, each signal transmitted by the wireless transmission means has a series of address bits and a series of data bits wherein each series of address bits in each signal is identical and further wherein each transmitted signal has a different series of data bits to uniquely identify each wireless transmission means.

In an embodiment, the receiver is capable of comparing the first signal to a reference code.

In an embodiment, the first signal is capable of changing the reference code to lock out subsequent signals.

In an embodiment, a reset means is capable of sending a reset signal wherein the reset signal is capable of corresponding to the changed reference code.

In an embodiment, a bonus means is capable of controlling a bonus indicator.

In another embodiment of the present invention, a wireless lock-out apparatus is provided. The apparatus has a plurality of transmitters for transmitting a plurality of signals wherein each signal uniquely identifies one of the plurality of transmitters. A central processing component is provided wherein the central processing component includes a receiver for receiving a first transmitted signal, a processor for processing the first transmitted signal, a lock-out means for locking out subsequent transmitted signals, and an indicator for identifying the first transmitted signal.

In an embodiment, the indicator is an audible signal.

In an embodiment, the indicator is a visual signal.

In an embodiment, the indicator is an LED light.

In an embodiment, a reset transmitter is provided for transmitting a reset signal.

In an embodiment, a bonus transmitter is provided for transmitting a bonus signal wherein the bonus signal activates a bonus indicator.

In another embodiment of the present invention, a method for using a wireless lock-out system is provided. The method comprises the steps of: providing a plurality of transmitters for transmitting a plurality of signals from a plurality of users, each signal having a code that uniquely identifies a user; providing a receiver means for receiving the signals from the plurality of transmitters; sending a first signal from at least one of the plurality of transmitters to the receiver; providing a lock-out means for locking out subsequent signals after the first signal has been received by the receiver; and providing an indicator that identifies the user who sent the first signal.

In an embodiment, a reset transmitter that resets the system after the lock-out means locks out subsequent signals is provided and transmits a reset signal from the reset transmitter.

In an embodiment, a bonus transmitter is provided that indicates a bonus condition and transmits a bonus code from the bonus transmitter.

In an embodiment, a visual indicator that identifies the first signal received by the receiver is provided.

It is, therefore, an advantage of the present invention to provide a wireless lock-out signaling apparatus, a system and a method for using the same that is connected without using wires and has few or no moving parts.

Another advantage of the present invention is to provide a wireless lock-out signaling apparatus, a system and a method for using the same that is reliable, consistent and instills faith in the fairness of a competition using the same.

Yet another advantage of the present invention is to provide a wireless lock-out signaling apparatus, a system and a method for using the same that is portable.

Another advantage of the present invention is to provide a wireless lock-out signaling apparatus, a system and a method for using the same that is battery operated or can be plugged into a wall socket.

A still further advantage of the present invention is to provide a wireless lock-out signaling apparatus, a system and a method for using the same that requires minimal repair and maintenance and further is inexpensive to operate and repair.

And, another advantage of the present invention is to provide a wireless lock-out signaling apparatus, a system and a method for using the same to provide a number of contestants with the ability to be the first to signal at the push of a button.

A further advantage of the present invention is to provide a wireless lock-out apparatus, a system and a method for using the same that has a decoder circuit that interprets coded signal sent wirelessly.

Yet another advantage of the present invention is to provide a wireless lock-out signaling apparatus, a system and a method for using the same that signals audibly and/or visually the first contestant to signal.

Moreover, an advantage of the present invention is to provide a wireless lock-out signaling apparatus, a system and a method for using the same that is simple to operate.

A still further advantage of the present invention is to provide a wireless lock-out signaling apparatus, a system and a method for using the same that allows a wireless means to reset the apparatus.

Additional features and advantages of the present invention are described in, and will be apparent from, the detailed description of the presently preferred embodiments and from the drawings.

BRIEF DESCRIPTION OF THE DRAWINGS

FIG. 1 generally illustrates a perspective view of a receiver box according to the present invention.

FIG. 2 illustrates a perspective view of a master transmitter according to the present invention.

FIG. 3 illustrates a perspective view of a contestant's transmitter according to the present invention.

FIG. 4 illustrates a diagram of two parts of a flowchart illustrated in FIGS. 4A and 4B.

FIG. 4A illustrates a portion of a flowchart corresponding to a method of the present invention.

FIG. 8 illustrates a black box diagram of an embodiment of components of a circuit inside the receiver box according to the present invention.

DETAILED DESCRIPTION OF THE PRESENTLY PREFERRED EMBODIMENTS

Figure 4B:
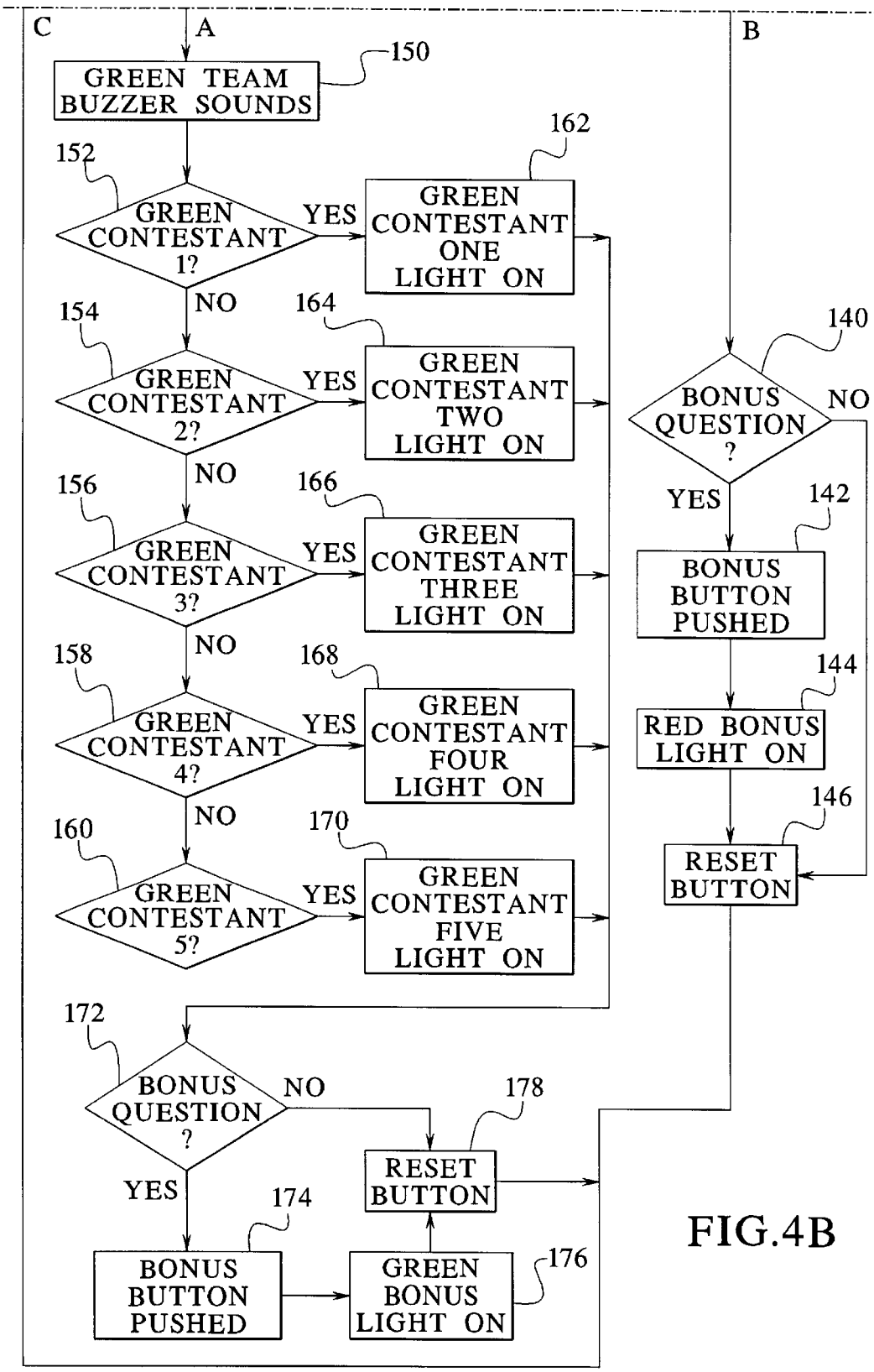
FIG. 4B illustrates an additional portion of the flowchart corresponding to the method of the present invention.

The present invention relates to a wireless lock-out signaling apparatus, a system and a method for using the same.

Referring now to the drawings wherein like numerals refer to like parts, FIG. 1 shows a receiver box 1 having an on/off switch 10, a power indicator light 12 and an AC adapter or car cigarette lighter adapter 14. The receiver box 1 may be powered by an AC current from a wall socket or a DC current from a battery source.

The receiver box 1 may have a plurality of lights 2a–2e. Further, a second plurality of lights 4a–4e may be provided as well. The two sets of lights 2a–2e and 4a–4e, may be provided on a top 5 of the receiver box 1 or on a side 8 of the receiver box 1 as shown in FIG. 1. Further, the two sets of lights 2a–2e and 4a–4e may preferably be LED lights. However, other visual indicators may be used as well, such as, for example, bulbs or any other visual indicator that may be apparent to those skilled in the art.

The two sets of lights 2a–2e and 4a–4e may correspond to two separate teams of contestants while each individual light may correspond to an individual teammate within either of the two teams. The lights 2a–2e may correspond to a first team, such as, for example, Team 1. The color of the lights 2a–2e may also correspond to the color of the team such as, for example, Team Red. It should be noted that any color lights are contemplated that may be apparent to those skilled in the art.

The individual teammates on the first team may each have a transmitter 30 (as shown in FIG. 3) that may be numbered, for example, from 1 to 5. In use, each individual transmitter 1–5 may activate one of the lights 2a–2e. Transmitter 1 of the first team may correspond to light 2a; transmitter 2 may correspond to light 2b; transmitter 3 may correspond to light 2c; transmitter 4 may correspond to light 2d; and transmitter 5 may correspond to light 2e.

Alternatively, lights 4a–4e may correspond to Team 2 which may also correspond to a color such as green. The lights 4a–4e may be color coded to correspond with the color of the team. As with the first team, the second team may have a set of transmitters numbered from 1 to 5. Each transmitter 1–5 of the second team may correspond to an individual light 4a–4e as well.

Each individual team member may have a transmitter 30 that may send a signal that may be received by the receiver box 1. The receiver box 1 may interpret the signal sent by the individual team member's transmitter and thereby light up or activate the light 2a–2e or 4a–4e that corresponds to the individual team member's transmitter 30. The receiver box 1 may also contain two lights 6a and 6b that may correspond to "bonus" lights for either the first team or the second team, respectively. Particular contests may be structured to allow a team the opportunity to answer a "bonus" question if, for example, the team answers a question correctly. Hereinafter, this condition will be referred to as a "bonus condition." For example, when a teammate from either team signals the receiver box 1 thereby lighting up an individual light 2a–2e or 4a–4e corresponding to the teammate's transmitter 30, a user in control of a master transmitter 20 (as shown in FIG. 2) may activate the bonus light 6a or 6b that corresponds to the team that the teammate is from. As shown in FIG. 1, the bonus light 6a corresponds to the first team and the plurality of lights 2a–2e. Likewise, the bonus light 6b corresponds to the second team and the plurality of lights 4a–4e.

The plurality of lights on the receiver box 1 may be configured in any manner as may be apparent to those skilled in the art. Indeed, the lights may be arranged in such a way as to provide a space below each light where the names of each of the contestants may be written (not shown). Alternatively, a seven segment LED display (not shown) may be provided wherein the contestant's number may light up when the contestant has signaled the receiver box 1. Further, a return signal (not shown) may be transmitted from the receiver box 1 to discrete lights that may be positioned in proximity to each contestant. Therefore, when a contestant correctly signals the receiver box 1, the light in the proximity of that contestant may light up thereby providing a visual indicator of which contestant signaled the receiver box 1. The return signal may be done via any transmittable means, such as by radio frequency or infrared.

Further, a display unit (not shown), such as, for example, a display screen, may display the names of each of the contestants. A keyboard (not shown) attached to a microprocessor (not shown) may be provided to allow the names of the contestants to be entered therein. When a contestant signals the receiver box 1, the display may show the name of the contestant who signaled.

The present invention should not be construed as limited to the manner by which contestants are displayed. Any means of displaying contestants and signaling which contestants signaled the receiver box first is contemplated.

FIG. 2 shows a master transmitter 20 having two buttons 22a,22b. The button 22a activates a signal that may be sent to the receiver box 1 causing the bonus light 6a or 6b to activate. The bonus light 6a may activate if a member from the first team signaled first. Alternatively, the bonus light 6b may activate if a member from the second team signaled first. Preferably, the receiver box 1 may make a determination of whether the bonus light 6a or 6b should activate based on which team sent the original signal. In use, after a member of the first team or the second team has signaled the receiver box 1 and the team member or team has answered the question posed correctly, the user of the master transmitter may push button 22a. The receiver box 1 then activates bonus light 6a or 6b depending on whether the first team or the second team sent the original signal.

Further, the button 22b may send a signal to the receiver box 1 thereby resetting the receiver box 1 when a contestant has activated one of the plurality of lights or when the master transmitter has sent a signal activating either of the bonus lights 6a or 6b via the bonus button 22a. A light 24 may be provided on the master transmitter 20 that activates when either the bonus button 22a or the reset button 22b is depressed. As with the previous lights, the light is preferably an LED light. However, other lights are contemplated that may be apparent to those skilled in the art.

FIG. 3 shows a contestant's transmitter 30 having a signal button 32. The signal button 32 may activate a signal and may send the signal to the receiver box 1. A light 34 may be provided on each contestant's transmitter 30 that may indicate when the signal button 32 has been depressed.

Alternatively, the signal lights 24,34 may provide an indication that batteries that may be contained within the master transmitter 20 or the contestant's transmitter 30 have become depleted and should be replaced.

Figure 5:
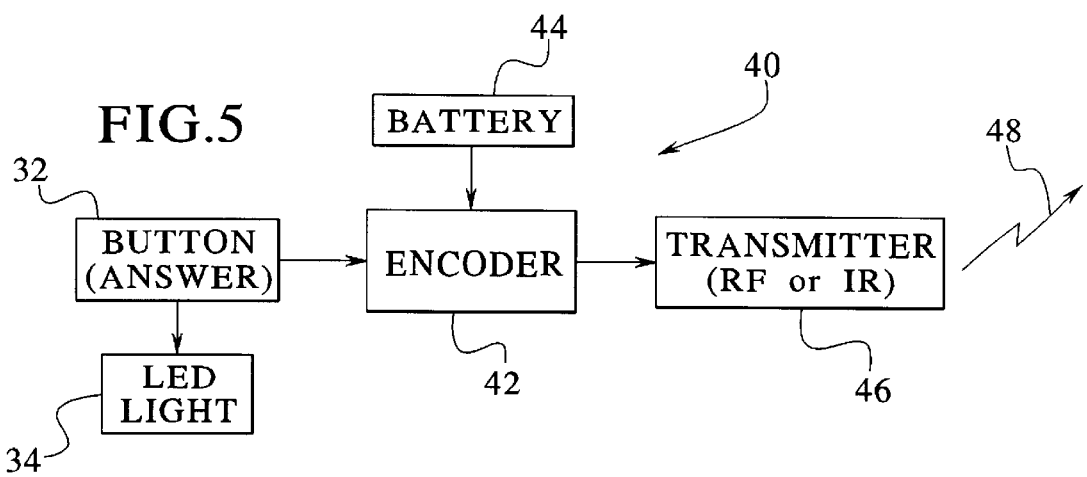
FIG. 5 illustrates a black box diagram of an embodiment of components of a contestant's transmitter according to the present invention.

FIG. 5 illustrates a black box diagram 40 of the contestant's transmitter 30. The contestant's transmitter 30 may contain a signal button 32, a light 34, an encoder 42, a battery 44 and a signal transmission means 46. The battery 44 may provide an electrical current through the system. The button 32 may act as a switch allowing current to flow through the encoder 42 and the transmitter 30 or otherwise signaling the encoder 42 that the button 32 has been depressed. The light 34 may activate when the button 32 has been pushed.

The encoder 42 may be any encoder suitable for encoding a signal, such as, for example, an HT-12E encoder produced by Holtek Microelectronics, Inc. The Holtek HT-12E, or other like encoder, may encode a signal having eight address bits, each set at either a low position or a high position and four data bits each also set at either a low position or a high position. The encoder 42 may encode a signal that may be sent to the signal transmission means 46 to be converted into a transmittable signal 48. The transmittable signal 48 may be a radio frequency wave, an infra-red signal, or any other like signal apparent to those skilled in the art that may be sent from the signal transmission means 46 to the receiver box 1.

Figure 6:
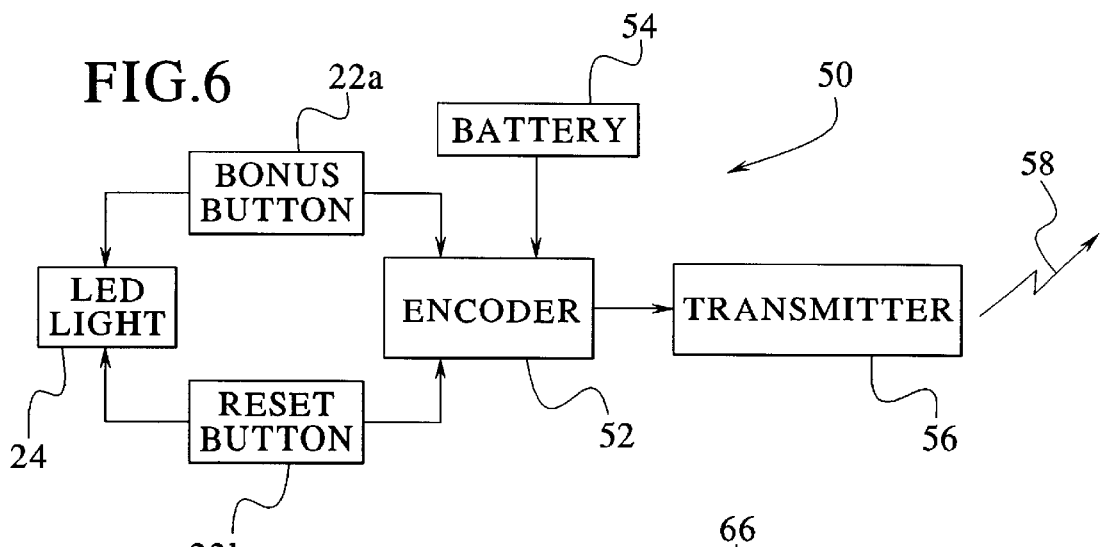
FIG. 6 illustrates a black box diagram of an embodiment of components of a master transmitter according to the present invention.

FIG. 6 illustrates a black box diagram 50 of the master transmitter 20. The master transmitter 20 may contain the bonus button 22a and the reset button 22b. Further, the light 24 may be provided to indicate that the bonus button 22a or the reset button 22b has been depressed or otherwise activated. Further, the master transmitter 20 may contain an encoder 52, a battery 54 and a signal transmission means 56.

In use, the battery 54 may provide an electrical current through the master transmitter 20. The bonus button 22a or the reset button 22b may act as switches to provide the electrical current through the encoder 52 and the transmitter 56 or otherwise send a signal indicating that the bonus button 22a or the reset button 22b has been depressed. The encoder 53 interprets which button 22a or 22b is depressed and encodes a signal corresponding to the bonus button 22a or the reset button 22b. The signal is sent to the transmitter 56 which then sends a transmittable signal 58 as a radio frequency wave, an infra-red signal or any other like signal that may be apparent to those skilled in the art.

Figure 7:
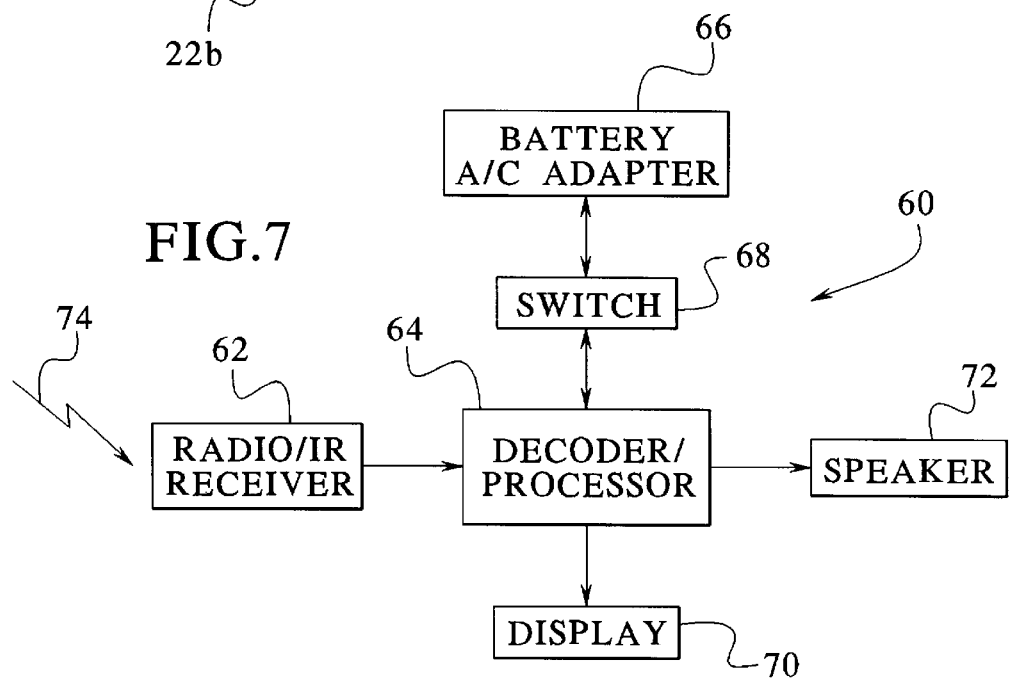
FIG. 7 illustrates a black box diagram of an embodiment of components of a receiver of the present invention.

The eight address bits and four data bits incoded into the transmittable signals 48,58 may be decoded by a decoder/processor 64 (as shown in FIG. 7) in the receiver box 1. The eight address bits may be used to gate the signal 48 or 58 through the system. The four data bits may activate a plurality of functions in the receiver box 1, including activating one of the lights 2a–2e or 4a–4e, activating an audible signal, activating a bonus light 6a or 6b, locking out subsequent contestant's transmitters 30, and/or resetting the system. See below with reference to FIG. 8 for a detailed description of the eight address bits and four data bits.

FIG. 7 illustrates a black box diagram 60 of the receiver box 1. The receiver box 1 may contain the following components: a radio frequency/infra-red receiver 62, the decoder/processor 64, a battery or AC adapter 66, a switch 68, a display 70 and a speaker 72.

The radio frequency/infra-red receiver 62 may receive a wireless signal 74 and route the signal to the decoder/processor 64. The decoder/processor 64 may interpret the signal and determines whether the signal matches a reference code provided in the decoder/processor 64. If the signal matches the reference code provided in the decoder/processor 64 and the signal is the first to reach the decoder/processor 64, then the decoder/processor 64 locks out other transmitted signals 48 from other transmitters 30 from being received from the decoder/processor 64 by changing the reference code.

If the transmitted signal 74 is from a contestant's transmitter 30, if it matches the code provided on the decoder/processor 64 and if it is the first to be received by the decoder/processor 64, then the decoder/processor 64 sends a signal to the display 70 which may contain the plurality of lights 2a–2e, 4a–4e (as shown in FIG. 1). The transmitted signal may indicate to the processor 64 which of the contestant's transmitters sent the signal thereby activating an individual light corresponding to the individual transmitted signal 74. Further, the decoder/processor 64 may send a signal to the speaker 72 thereby indicating audibly which of the individual contestant's transmitters sent the signal, or, in the alternative, which of the teams sent the signal that was received by the decoder/processor 64.

Alternatively, the transmitted signal 74 may be from the master transmitter 20 and may either be a bonus signal or a reset signal. The decoder/processor 64 may interpret the bonus signal or the reset signal. If the signal is the bonus signal, then the decoder/processor 64 may send a signal to the display 70 thereby activating the bonus light 6a or 6b as provided in FIG. 1. Alternatively, if the signal is the reset signal, the decoder/processor 64 may reset the receiver box 1. The precise nature of the coded signals and how the decoder/processor 64 locks out subsequent signals will be described with reference to FIG. 8.

Referring now to FIG. 4, FIG. 4 illustrates two parts of a flowchart generally shown in FIGS. 4A and 4B. FIG. 4A illustrates a portion of a flowchart including an activation step 100 that allows the system to be activated. After the system is turned on through the activation step 100, the user may then determine whether the machine is reset with the machine reset step 102. If the machine if not reset (meaning lights have been activated or contestant transmitters have been locked out of the system), then the user may proceed to the "push reset button" step 104 by pushing the reset button 22b on the master transmitter 20. Once the system has been reset, the system may receive signals from contestants' transmitters.

The system then may begin an "input signal from transmitters 1–10" routine 106 whereupon the system may receive a signal from any of the transmitters 20,30. The decoder/processor 64 (as shown in FIG. 7) may attempt to match the address code in the signal with a reference address code within the decoder/processor 64. This may be performed as generally set forth at step 108. If the signal does not match the code on the decoder/processor 64, then the system returns to the "input signal from transmitters 1–10" routine 106. If the signal matches the code in the decoder/processor 64, then the decoder/processor 64 may determine whether the signal is the first to have the correct address code as generally shown at step 110. If the signal is the first to have the correct code, then the decoder/processor 64 may lock out other signals as generally shown at step 112. Steps 106–112 are shown in detail in FIG. 8 which will be discussed below.

Next, the decoder/processor 64 may attempt to determine whether the signal is from the first team, such as, for example, the red team or from the second team, such as, for example, the green team. If the signal came from the green team, then the flowchart may continue through flow-chart path A as seen in FIGS. 4A and 4B.

If the individual whose signal was transmitted to the decoder/processor 64 is from the red team, then an audible signal, such as a buzzer, may activate as generally shown at step 116. Next, the decoder/processor 64 may attempt to determine which of five possible red team contestants transmitted the signal in steps 118, 120, 122, 124 and 126. If, for example, the red contestant no. 1 sent the signal, then the light corresponding to red contestant no. 1 may turn on indicating that red contestant no. 1 sent the signal. Further, if the red contestant no. 2 sent the signal, then step 120 may determine this fact. If the red contestant no. 2 sent the signal, then as generally shown at step 130, the light corresponding to red contestant no. 2 may activate indicating that red contestant no. 2 sent the signal.

The steps 118 through 126 may continue until the decoder/processor 64 determines which contestant pushed the button to send the transmitted signal. After the decoder/processor 64 determines which red contestant pushed the button to send the transmitted signal, then the flowchart continues through "B" in FIG. 4B.

Step 140 determines whether a bonus question condition exists. If a bonus question condition exists, then bonus button 22a may be pushed at step 142 by a user of the master transmitter 20 whereupon the red bonus light 6a may turn as generally shown at step 144. Otherwise, if a bonus condition does not exist, then the reset button 22b may be pushed thereby resetting the system and unlocking the decoder/processor 64 to allow transmitted signals to be sent to the decoder/processor 64. After the reset button 22b is pushed, the flowchart may return to step 106.

Returning to step 114, if an individual from the green team sent the signal, then the flowchart may continue through "A" on FIG. 4B. First, as generally shown at step 150, the green team buzzer may audibly be heard indicating that an individual from the green team sent the signal. At steps 152–160, the decoder/processor 64 may determine which of the green team contestants 1–5 sent the signal. Once the decoder/processor 64 determines which contestant sent the signal, then as generally shown at steps 162–170, the decoder/processor 64 may activate the light corresponding to the individual contestant thereby indicating which contestant sent the signal to the decoder/processor 64.

If a bonus condition exists as generally shown at step 172, then the user of the master transmitter 20 may push the bonus button 22a as generally shown at step 174. After the bonus button 22a is pushed, the bonus light 6b may activate at step 176 indicating a bonus condition for the green team. The user of the master transmitter 20 may then push the reset button 22b thereby resetting the system. Otherwise, if a bonus condition does not exist, then the reset button may be pushed as generally shown at step 178. After the button 22b is pushed to reset the system, the flowchart starts over as generally shown at step 106.

Referring now to FIG. 8, the circuitry of the decoder/processor 64 in FIG. 7 is shown. The decoder/processor 64 may be split into a decoder 200 and a processor 202. The decoder 200 may be any decoder capable of receiving a transmitted signal 201 and interpreting it, such as, for example, a Holtek Microelectronics, Inc. HT-12D Decoder. The decoder 200 may contain a series of address bits A0–A7. Each address bit may be set binarily with a "1" or a "0" (or as a high state or a low state). The transmitted input signal 201 also may have a series of address bits A0–A7 and data bits D0–D3 that may be set as a "1" or a "0". The address bits A0–A7 in the decoder may act as a "gate" whereby the decoder may compare the address bits A0–A7 in the input signal 201 to the address bits A0–A7 in the decoder 200. Each transmitted signal 201 from a contestant's transmitter 30 may have identical address bits A0–A7 so that each may correspond to the reference address bits A0–A7 in the decoder 200 thereby allowing each transmitter 30 to have the potential of having its signal gated through the decoder 200 into the processor 202. Each contestant, however, may have a unique set of the four data bits D0–D3 that uniquely identifies each of the contestants.

If the transmitted address bits A0–A7 in the input signal 201 match the address bits A0–A7 of the decoder 200, then the decoder 200 may allow the coded signal of the four data bits D0–D3 included in the transmitted input signal 201 to be sent to the processor 202 and received at A0–A3 in the processor 202. The data bits D0–D3 may each be set at either "0" or "1". Since each contestant's transmitter 30 may have a unique combination of the four data bits, the data bits D0–D3 indicates to the processor 202 which individual contestant may have transmitted the signal. The signal may then be routed to its corresponding light and audible signal.

For example, the stored code of the four data bits for the green contestant no. 1 may be, for example, "0-0-0-1." The four data bits sent by the green contestant no. 1 would be "0-0-0-1." The processor 202 would "see" the four data bits "0-0-0-1" in the signal, compare it to a stored library of four data bit codes, and determine that green contestant no. 1 sent the signal. If the four data bits D0–D3 match up with the stored code of green contestant no. 1 (indicated as G1 in the processor 202), then the processor 202 may send a signal to the green light no. 1 thereby activating green light no. 1. Further, the processor 202 may activate an audible signal at the speaker 210 indicating that an individual on the green team sent the transmitted signal.

Alternatively, if an individual from the red team sent the signal 201, the data bits D0–D3 may match up with four stored data bits in the processor 202 that correspond to the individual on the red team who sent the signal. Once the processor 202 determines which individual on the red team sent the transmitted signal, the processor 202 may route the signal through the red team. Further, the signal may be routed to a speaker 212 that may activate an audible signal corresponding to the red team thereby indicating that an individual on the red team sent the transmitted signal. The speakers 210 and 212 may be separate audible indicators as shown in FIG. 8. Alternatively, the audible signal corresponding to either team may emanate from the same speaker.

Each input signal 201 from each contestant's transmitter 30 may have identical address bits A0–A7. Also, each contestant's input signal 201 may have bit A7 set at "1", or at a high condition. The other address bits A0–A6 may be set at either a "0" or a "1". In order to lock out subsequent signals after the first signal is sent to the decoder 200, an "AND" gate 220 may be used. When the input signal 201 is sent to the decoder 200, the decoder 200 may compare the address bits A0–A7 to the stored code in the decoder 200. When the system is able to receive a transmitted signal from a contestant's transmitter 30, bit A7 in the decoder 200 may be set at "1" or at a high condition thereby matching the input signal 201 from a contestant's transmitter 30.

For each contestant, the data bits D0–D3 may be designed so that at least one data bit D0, D1, D2 or D3 may be set at "0" or at a low condition. The decoder 200 may be programmed to change address bit A7 in the decoder 200 to a "0" or low condition if any of the contestants' data bits are set at "0". When the signal is routed though the AND gate, the signal is aggregated and because of a "0" on one of the data bits D0, D1, D2 or D3, the bit A7 of the decoder 200 may switch to a "0" or to a low condition.

Because bit A7 in the decoder 200 may now be at "0", or set at a low condition, subsequent input signals 201 from contestant's transmitters 30 having address bits A0–A7 may no longer match the coded address bits A0–A7 in the decoder 200 since every contestant's address bit A7 may be set at "1". Therefore, no input signals 201 from contestant's transmitters 30 may pass their data bits D0–D3 through the decoder 200 into the processor 202. This may effectively lock out any subsequent input signals 201 from contestant's transmitters 30 after the first matching input signal 201 has been decoded and sent through the processor 202.

The input signal 201 may be the reset signal or the bonus signal sent from the master transmitter 20. The reset signal and bonus signal from the master transmitter 20 may have identical address bits A0–A6 relative to the contestants' signal, but address bit A7 may be set at "0". Therefore, when the reset button 22b or the bonus button 22a is pushed, the signal sent from the master transmitter may match with the reference signal in the decoder 200 when address bit A7 in the decoder is be set at "0". As discussed previously, this occurs after an input signal 201 from a contestant's transmitter 30 has switched address bit A7 in the decoder 200 from a "1" to a "0". When the bonus button 22a is pushed and the signal is routed through the decoder 200 into the processor 202, the processor 202 may be programmed to recognize the four data bits as corresponding to the bonus signal. The processor 202 may then route a signal through B1 and subsequently activate the particular bonus light.

However, if the reset button 22b is pushed, each of the four data bits D0–D3 may be set at "1" or at a high condition. The decoder 200 may be programmed to set address bit A7 in the decoder 200 to a "1" when each of the data bits D0–D3 is set at "1". This effectively resets the system in that contestants' signals may now be gated through the decoder 200 because the address bit A7 in the decoder now matches the address bit A7 from a transmitted input signal 201 from a contestant's transmitter 30.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A wireless lock-out system for a competition between contestants from opposing teams, the system comprising:

a plurality of wireless transmission means corresponding to the contestants from opposing teams wherein the transmission means transmits a signal wherein each signal uniquely identifies one of the plurality of wireless transmission means corresponding to one of the contestants of the competition;

a receiver for receiving the signal of the wireless transmission means wherein the receiver identifies each of the plurality of wireless transmission means and further wherein the receiver identifies a first transmitted signal and locks out subsequent signals from the receiver; and an indicator means for identifying the first transmitted signal from one of the contestants.

2. The wireless system of claim 1 further comprising:

a master wireless transmission means for unlocking the decoder after the first transmitted signal has locked out the subsequent signals.

3. The system of claim 1 wherein the indicator is an audible signal.

4. The system of claim 1 wherein the indicator is a visual signal.

5. The system of claim 1 wherein the receiver has a decoder for decoding the first transmitted signal.

6. The system of claim 1 wherein each signal transmitted by the wireless transmission means has a series of address bits and a series of data bits wherein each series of address bits in each signal is identical and further wherein each transmitted signal has a different series of data bits to uniquely identify each wireless transmission means.

7. The system of claim 1 wherein the receiver is capable of comparing the first signal to a reference code.

8. The system of claim 7 wherein the first signal is capable of changing the reference code to lock out subsequent signals.

9. The system of claim 8 further comprising:
a reset means capable of sending a reset signal wherein the reset signal is capable of corresponding to the changed reference code.

10. The system of claim 1 further comprising:
a bonus means capable of controlling a bonus indicator.

11. A wireless lock-out apparatus for a game having a plurality of teams and a plurality of contestants on each of the plurality of teams, the apparatus comprising:
a plurality of transmitters wherein each of the plurality of transmitters is used by a corresponding one of the plurality of contestants wherein the plurality of transmitters transmit a plurality of signals wherein each signal uniquely identifies one of the plurality of transmitters; and
a central processing component wherein the central processing component has a receiver for receiving a first transmitted signal, a processor for processing the first transmitted signal, a lock-out means for locking out subsequent transmitted signals, and an indicator for identifying the first transmitted signal wherein the indicator identifies one of the plurality of contestants from one of the plurality of teams.

12. The apparatus of claim 11 wherein the indicator is an audible signal.

13. The apparatus of claim 11 wherein the indicator is a visual signal.

14. The apparatus of claim 11 wherein the indicator is an LED light.

15. The apparatus of claim 11 further comprising:
a reset transmitter for transmitting a reset signal.

16. The apparatus of claim 11 further comprising:
a bonus transmitter for transmitting a bonus signal wherein the bonus signal activates a bonus indicator.

17. A method for using a wireless lock-out system for a game having a plurality of teams and a plurality of contestants on each of the plurality of teams, the method comprising the steps of:
providing a plurality of transmitters corresponding to each of the plurality of contestants wherein the plurality of transmitters transmit a plurality of signals from the plurality of contestants, wherein each signal has a code that uniquely identifies one of the plurality of contestants;
providing a receiver means for receiving the signals from a plurality of transmitters;
sending a first signal from at least one of the plurality of transmitters corresponding to at least one of the opposing teams to the receiver;
providing a lock-out means to lock out subsequent signals from the plurality of transmitters after the first signal has been received by the receiver; and
providing an indicator that identifies the contestant who sent the first signal.

18. The method of claim 17 further comprising the steps of:
providing a reset transmitter that resets the system after the lock-out means locks out subsequent signals; and
transmitting a reset signal from the reset transmitter.

19. The method of claim 17 further comprising the steps of:
providing a bonus transmitter that indicates a bonus condition; and
transmitting a bonus code from the bonus transmitter.

20. The method of claim 17 further comprising the step of:
providing a visual indicator that identifies the first signal received by the receiver.

* * * * *